(12) United States Patent
Park et al.

(10) Patent No.: US 11,669,129 B2
(45) Date of Patent: *Jun. 6, 2023

(54) DISPLAY DEVICE AND METHOD OF MANUFACTURING THE SAME

(71) Applicant: Samsung Display Co., Ltd., Yongin-si (KR)

(72) Inventors: Changmin Park, Gwangmyeong-si (KR); Sangwol Lee, Yongin-si (KR); Kyungmin Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/485,516

(22) Filed: Sep. 27, 2021

(65) Prior Publication Data

US 2022/0011823 A1 Jan. 13, 2022

Related U.S. Application Data

(63) Continuation of application No. 16/363,539, filed on Mar. 25, 2019, now Pat. No. 11,132,027.

(30) Foreign Application Priority Data

Apr. 3, 2018 (KR) ........................ 10-2018-0038593

(51) Int. Cl.
*G06F 1/16* (2006.01)
*H04M 1/02* (2006.01)

(52) U.S. Cl.
CPC .......... *G06F 1/1652* (2013.01); *G06F 1/1616* (2013.01); *G06F 1/1681* (2013.01); *H04M 1/0216* (2013.01); *H04M 1/0268* (2013.01)

(58) Field of Classification Search
CPC .... H05K 1/028; H05K 1/0281; H05K 1/0277; H05K 1/18; H05K 1/118; H05K 1/147;
(Continued)

(56) References Cited

U.S. PATENT DOCUMENTS 6,104,464 A 8/2000 Adachi et al.
8,855,726 B2 * 10/2014 Ozawa ................ H04M 1/0216
455/575.4
(Continued)

FOREIGN PATENT DOCUMENTS

CN 104241295 12/2014
CN 106611773 5/2017
(Continued)

OTHER PUBLICATIONS

Non-Final Office Action dated Sep. 24, 2020, in U.S. Appl. No. 16/363,539.
(Continued)

*Primary Examiner* — Hoa C Nguyen
(74) *Attorney, Agent, or Firm* — H.C. Park & Associates, PLC

(57) ABSTRACT

A display module including non-folding portions and a folding portion disposed between the non-folding portions; a first supporting member disposed under the display module; and a second supporting member disposed between the display module and the first supporting member, wherein the first supporting member includes: a first supporter and a second supporter overlapping with the non-folding portions; and a plurality of supporting units overlapping with the folding portion.

12 Claims, 20 Drawing Sheets

(58) Field of Classification Search
CPC ......... H05K 1/189; H05K 2201/10218; H05K 7/20954; G06F 1/1651; G06F 1/1616; G06F 1/1618; H04M 1/0216; H04M 1/0268

See application file for complete search history.

(56) References Cited

U.S. PATENT DOCUMENTS

| | | | |
|---|---|---|---|
| 9,013,864 | B2 | 4/2015 | Griffin et al. |
| 9,250,733 | B2 | 2/2016 | Lee et al. |
| 9,348,450 | B1 | 7/2016 | Kim |
| 9,535,452 | B2 | 1/2017 | Ahn |
| 9,898,051 | B2 | 2/2018 | Cho et al. |
| 9,911,793 | B2 | 3/2018 | Lee et al. |
| 9,947,726 | B2 | 4/2018 | Lee |
| 10,177,327 | B2 | 1/2019 | Jung et al. |
| 10,204,846 | B2 | 2/2019 | Kim |
| 10,424,632 | B2 | 9/2019 | Nakamura |
| 10,448,522 | B2 | 10/2019 | Han |
| 10,457,029 | B2 | 10/2019 | Kim et al. |
| 10,694,623 | B2 | 6/2020 | Park |
| 2010/0238612 | A1 | 9/2010 | Hsiao et al. |
| 2012/0307423 | A1 | 12/2012 | Bohn et al. |
| 2013/0216740 | A1 | 8/2013 | Russel-Clarke et al. |
| 2014/0361262 | A1 | 12/2014 | Kim |
| 2015/0131222 | A1 | 5/2015 | Kauhaniemi et al. |
| 2015/0257289 | A1 | 9/2015 | Lee et al. |
| 2016/0007441 | A1 | 1/2016 | Matsueda |
| 2016/0118616 | A1 | 4/2016 | Hiroki et al. |
| 2016/0187935 | A1 | 6/2016 | Tazbaz et al. |
| 2016/0195901 | A1 | 7/2016 | Kauhaniemi et al. |
| 2017/0123461 | A1 | 5/2017 | Kim et al. |
| 2017/0194580 | A1 | 7/2017 | Lee |
| 2017/0357289 | A1 | 12/2017 | Ahn |
| 2018/0092223 | A1 | 3/2018 | Hsu |
| 2018/0124931 | A1 | 5/2018 | Choi et al. |
| 2018/0136700 | A1 | 5/2018 | Chen et al. |
| 2018/0150108 | A1 | 5/2018 | Song |
| 2018/0291949 | A1* | 10/2018 | Le .............................. E05D 1/00 |
| 2019/0018459 | A1* | 1/2019 | Hong ..................... G06F 1/1616 |
| 2019/0346889 | A1* | 11/2019 | Chen .................. H04M 1/0268 |
| 2020/0315039 | A1 | 10/2020 | Sasaki et al. |

FOREIGN PATENT DOCUMENTS

| | | |
|---|---|---|
| CN | 107067976 | 8/2017 |
| CN | 206400960 U | 8/2017 |
| CN | 107799669 | 3/2018 |
| CN | 107819072 | 3/2018 |
| KR | 10-2014-0101274 | 8/2014 |
| KR | 10-2016-1634175 | 7/2015 |
| KR | 10-2016-0017843 | 2/2016 |
| KR | 10-2016-0083608 | 7/2016 |
| KR | 10-2016-0118407 | 10/2016 |
| KR | 10-2016-0144912 | 12/2016 |
| KR | 10-2017-0001819 | 1/2017 |
| KR | 10-2017-0051854 | 5/2017 |
| KR | 10-2017-052708 | 6/2017 |
| KR | 10-2017-0063378 | 6/2017 |
| KR | 10-2017-0080799 | 7/2017 |
| KR | 10-2017-0139740 | 12/2017 |
| KR | 10-2018-0026598 | 3/2018 |
| KR | 10-2018-1875855 | 7/2018 |

OTHER PUBLICATIONS

Final Office Action dated Feb. 24, 2021, in U.S. Appl. No. 16/363,539.
Advisory Action dated May 4, 2021, in U.S. Appl. No. 16/363,539.
Notice of Allowance dated May 26, 2021, in U.S. Appl. No. 16/363,539.
Korean Office Action dated Jan. 25, 2022, in Korean Patent Office for Korean Patent Application No. 10-2018-0038593.
Non-Final Office Action dated Oct. 27, 2022, issued to U.S. Appl. No. 17/485,517.
Notice of Allowance dated Feb. 1, 2023, in U.S. Appl. No. 17/485,517.

* cited by examiner

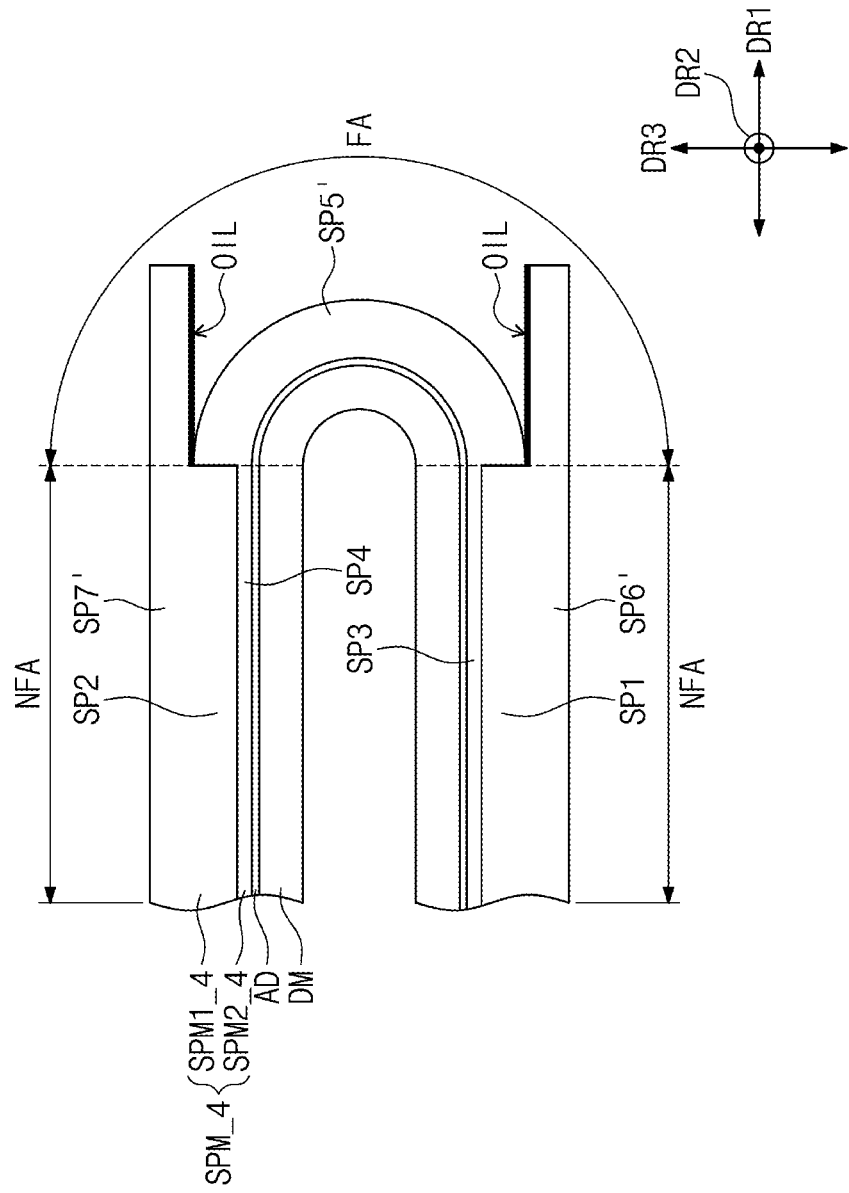

DISPLAY DEVICE AND METHOD OF MANUFACTURING THE SAME

CROSS-REFERENCE TO RELATED APPLICATION

This application is a Continuation of U.S. patent application Ser. No. 16/363,539, filed on Mar. 25, 2019, which claims priority from and the benefit of Korean Patent Application No. 10-2018-0038593, filed on Apr. 3, 2018, which are hereby incorporated by reference for all purposes as if fully set forth herein.

BACKGROUND

Field

The present disclosure relates to a display device and a method of manufacturing the display device.

Discussion of the Background

In general, electronic devices, such as a smartphone, a digital camera, a notebook computer, a navigation unit, a smart television, etc., include a display device to display an image. The display device generates the image and provides the generated image to a user through a display screen.

In recent years, as technologies of the display device continue to develop, various display devices have been developed. For example, a flexible display device that is curved, folded, or rolled has been suggested. The flexible display device is easy to carry and improves a user's convenience. However, in case of a foldable display device, a folding portion of the display device is damaged or deformed due to a folding operation. Accordingly, there is an increasing need for the development of a display device, which is capable of preventing or reducing damage and deformation in the folding portion.

The above information disclosed in this Background section is only for understanding of the background of the inventive concepts, and, therefore, it may contain information that does not constitute prior art.

SUMMARY

Devices constructed according to exemplary embodiments of the invention provide a display device capable of preventing or reducing damage and deformation in a display module from being damaged and deformed from folding operations.

The methods according to exemplary embodiments of the invention provide a method of manufacturing the display device, which is capable of simplifying a manufacturing process.

Additional features of the inventive concepts will be set forth in the description which follows, and in part will be apparent from the description, or may be learned by practice of the inventive concepts.

According to one or more embodiments of the invention, a display device including: a display module including non-folding portions and a folding portion disposed between the non-folding portions; a first supporting member disposed under the display module; and a second supporting member disposed between the display module and the first supporting member, wherein the first supporting member may include: a first supporter and a second supporter overlapping with the non-folding portions; and a plurality of supporting units overlapping with the folding portion.

The first supporting member may include a metal material, and wherein the second supporting member may include an elastic material.

The first supporting member may include an aluminum or a stainless steel, and wherein the second supporting member may include a rubber, a silicon, or an urethane.

The display device may further include an adhesive member attaching the display module to the second supporting member.

The second supporting member may be attached to the first supporting member.

The folding portion and the non-folding portions may be arranged in a first direction, and the supporting units may extend in a second direction crossing the first direction.

The folding portion may be configured to fold rotating with respect to a rotational axis substantially parallel to the second direction to fold the display module, and wherein the supporting units may be spaced apart from each other along the folding portion, and the display module may be inwardly folded not to be exposed to an outside.

The first supporting member may have a thickness from about 0.1 mm to about 0.5 mm in a third direction substantially vertical to a plane surface defined by the first and second directions.

The second supporting member may have a thickness from about 0.2 mm to about 0.3 mm in the third direction.

According to one or more embodiments of the invention, a method of manufacturing a display device, including: forming a plurality of cutting grooves on a lower surface of a folding area of a first supporting member, which is disposed between non-folding areas of the first supporting member; providing a second supporting member on the first supporting member; providing a display module on the second supporting member; bending the folding area and a folding portion of the display module corresponding to the folding area to inwardly fold the display module; and cutting portions of the folding area corresponding to the cutting grooves by applying a stress occurring in the folding area, wherein the folding area and the non-folding areas may be arranged in a first direction, the cutting grooves extend in a second direction crossing the first direction, and the folding area and the folding portion are configured to rotate with respect to a rotational axis substantially parallel to the second direction to be bent.

The method of claim 10, wherein each of the cutting grooves may have a depth equal to or greater than a half of a thickness of the first supporting member and smaller than the thickness of the first supporting member in a third direction substantially vertical to a plane surface defined by the first and second directions.

The method of claim 10, wherein the first supporting member may include a metal material, and wherein the second supporting member may include an elastic material.

The method may further include attaching the display module to the second supporting member using an adhesive member.

According to one or more embodiments of the invention, a display device including: a display module including non-folding portions and a folding portion disposed between the non-folding portions; a first supporting member disposed under the display module, the first supporting member including a first supporter and a second supporter overlapping with the non-folding portions of the display module; a second supporting member disposed between the non-folding portions and the first and second supporters and between the first supporter and the second supporter, the second supporting member having a predetermined elasticity; and an adhesive member attaching the display module to the second supporting member.

The second supporting member may include: a third supporter disposed between the first supporter and the non-folding portion of the display module overlapping the first supporter; a fourth supporter disposed between the second supporter and the non-folding portion of the display module overlapping the second supporter; and a fifth supporter disposed between the first supporter and the second supporter.

The fifth supporter may include a plurality of protrusions, wherein the folding portion and the non-folding portions may be arranged in a first direction, and wherein the protrusions may extend in a second direction crossing the first direction and protrude downward more than a lower surface of each of the first and second supporters.

A lower surface of the fifth supporter may be formed flush with a lower surface of each of the first and second supporters.

The display device may further include: a sixth supporter disposed under the fifth supporter and the first supporter; and a seventh supporter disposed under the fifth supporter and the second supporter, wherein the sixth supporter and the seventh supporter may be spaced apart from each other with respect to a center of the fifth supporter.

A portion of the sixth supporter may be disposed under a predetermined portion of the first supporter adjacent to the fifth supporter collinearly connected to a lower portion of the first supporter, and wherein a portion of the seventh supporter may be disposed under a predetermined portion of the second supporter adjacent to the fifth supporter and the seventh supporter connected to a lower portion of the predetermined portion of the second supporter.

The display device may further include oil layers respectively disposed on a portion of the sixth supporter overlapping with the fifth supporter and a portion of the seventh supporter overlapping with the fifth supporter, wherein the sixth supporter may be integrally provided with the first supporter, and the seventh supporter may be integrally provided with the second supporter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 18 illustrates a folding state of the supporting member and the display module shown in FIG. 17.

DETAILED DESCRIPTION

Figure 1:
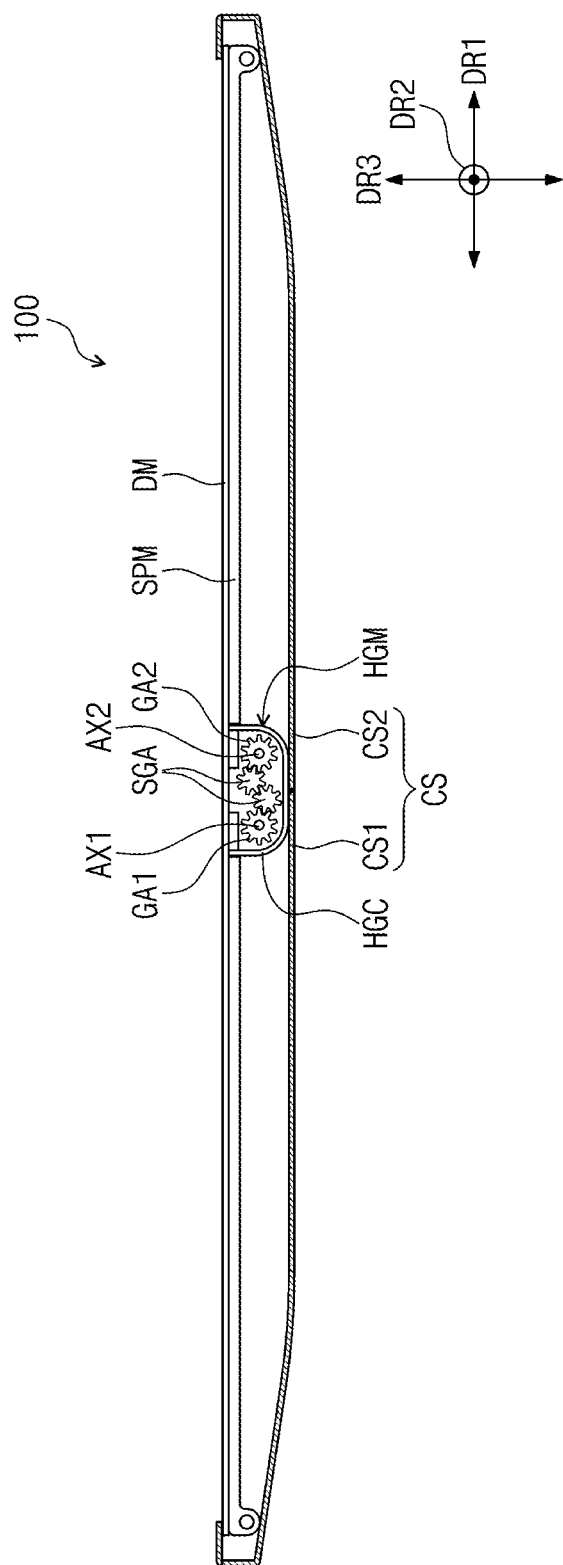
FIG. 1 is a cross-sectional view of a display device according to an exemplary embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order.

For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
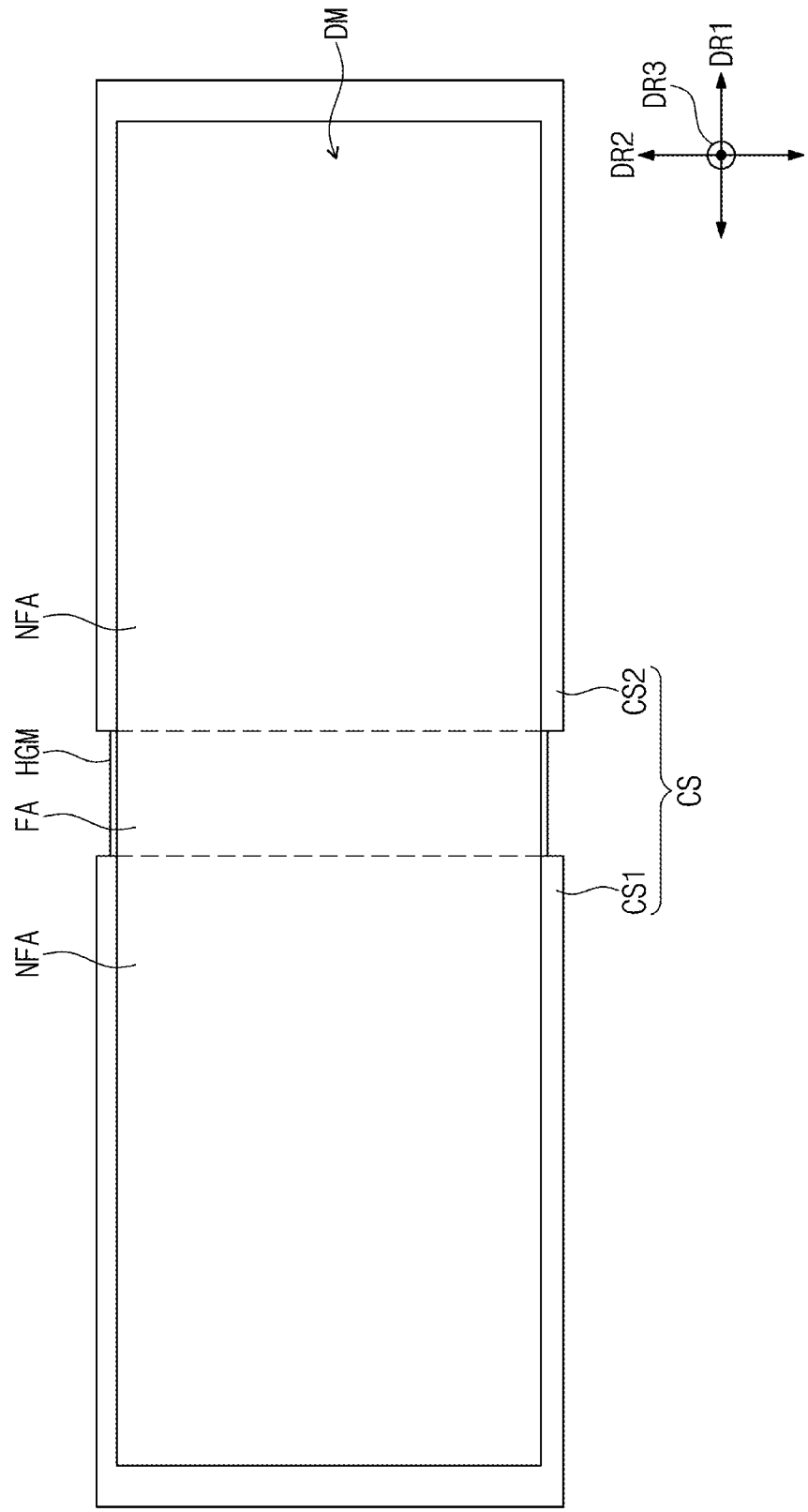
FIG. 2 is a top view of an upper surface of the display device shown in FIG. 1.

FIG. 1 is a cross-sectional view of a display device 100 according to an exemplary embodiment of the present disclosure. FIG. 2 is a top view of an upper surface of the display device 100 shown in FIG. 1.

Referring to FIGS. 1 and 2, the display device 100 according to the present disclosure has a rectangular shape defined by a pair of long sides extending in a first direction DR1 and a pair of short sides extending in a second direction DR2 crossing the first direction DR1. However, the display device 100 may have a variety of shapes according to different exemplary embodiments. Hereinafter, a direction substantially vertical to a plane surface defined by the first and second directions DR1 and DR2 will be referred to as a third direction DR3.

The display device 100 includes a display module DM, a supporting member SPM, a hinge member HGM, and a case CS. The display module DM may include a display panel displaying an image, a touch panel disposed above the display panel to sense a user's touch, and a window disposed above the touch panel to protect the display panel and the touch panel. However, the inventive concept is not limited thereto, the display panel may include touch sensors used in the touch panel.

The display panel may be an organic light emitting display panel including a plurality of organic light emitting elements, but it should not be limited thereto or thereby. That is, various display panels displaying the image, e.g., a liquid crystal display panel, an electrowetting display panel, an electrophoretic display panel, etc., may be used as the display panel of the present disclosure.

The display panel may be a flexible display panel. For example, the display panel may include a substrate formed of a plastic material having flexibility and a plurality of electronic elements (e.g., transistors) arranged on the substrate to drive the organic light emitting elements. The display panel may include a plurality of pixels arranged thereon, and the pixels may include the organic light emitting elements and the electronic elements.

The display module DM and the hinge member HGM are accommodated in the case CS. The case CS includes a first case CS1 and a second case CS2 arranged to be adjacent to each other in the first direction DR1. The first case CS1 and the second case CS2 are separated from each other when the display device 100 is folded and rotate with respect to a rotational axis.

The hinge member HGM is disposed at a center of the display device 100 to provide a first rotational axis AX1 and a second rotational axis AX2 to the center of the display device 100. The first rotational axis AX1 and the second rotational axis AX2 are adjacent to each other and parallel to the second direction DR2. The first case CS1 is connected to the hinge member HGM and rotates with respect to the first rotational axis AX1. The second case CS2 is connected to the hinge member HGM and rotates with respect to the second rotational axis AX2.

The hinge member HGM includes a hinge case HGC and a plurality of gear units GA1, GA2, and SGA accommodated in the hinge case HGC. The gear units GA1, GA2, and SGA include a first gear unit GA1 providing the first rotational axis AX1, a second gear unit GA2 providing the second rotational axis AX2, and a plurality of sub-gear units SGA disposed between the first gear unit GA1 and the second gear unit GA2.

When viewed in the second direction DR2, an outer circumferential surface of each of the first gear unit GA1, the second gear unit GA2, and the sub-gear units SGA has a gear shape. The first gear unit GA1, the second gear unit GA2, and the sub-gear units SGA are arranged to engage with each other, thereby rotating the first gear unit GA1, the second gear unit GA2, and the sub-gear units SGA.

The supporting member SPM is connected to the hinge member HGM and rotates with respect to the first rotational axis AX1 and the second rotational axis AX2. A configuration of the supporting member SPM will be described in detail with reference to FIGS. 4 and 5.

The display module DM is disposed on the supporting member SPM and folded when the supporting member SPM rotates with respect to the first rotational axis AX1 and the second rotational axis AX2. The display module DM includes non-folding portions NFA and a folding portion FA disposed between the non-folding portions NFA. The folding portion FA and the non-folding portions NFA are arranged in the first direction DR1.

FIG. 2 shows an exemplary embodiment including one folding portion FA and two non-folding portions NFA. According to the exemplary embodiment, each of the two non-folding portions NFA may be disposed on respective sides of the one folding portion FA. However, the number of non-folding portions NFA should not be limited to two, and the number of folding portions FA should not be limited to one.

When the display device 100 is folded, the supporting member SPM rotates with respect to the first and second rotational axes AX1 and AX2 by the hinge member HGM to be folded, and the display module DM is folded by the supporting member SPM. When the display module DM is folded, the folding portion FA of the display module DM is bent such that the non-folding portions NFA face each other. When the display device 100 is folded, the display module DM may be folded inward (i.e., an in-folding state) to prevent the display module DM from being exposed to the outside by the case CS.

Figure 3:
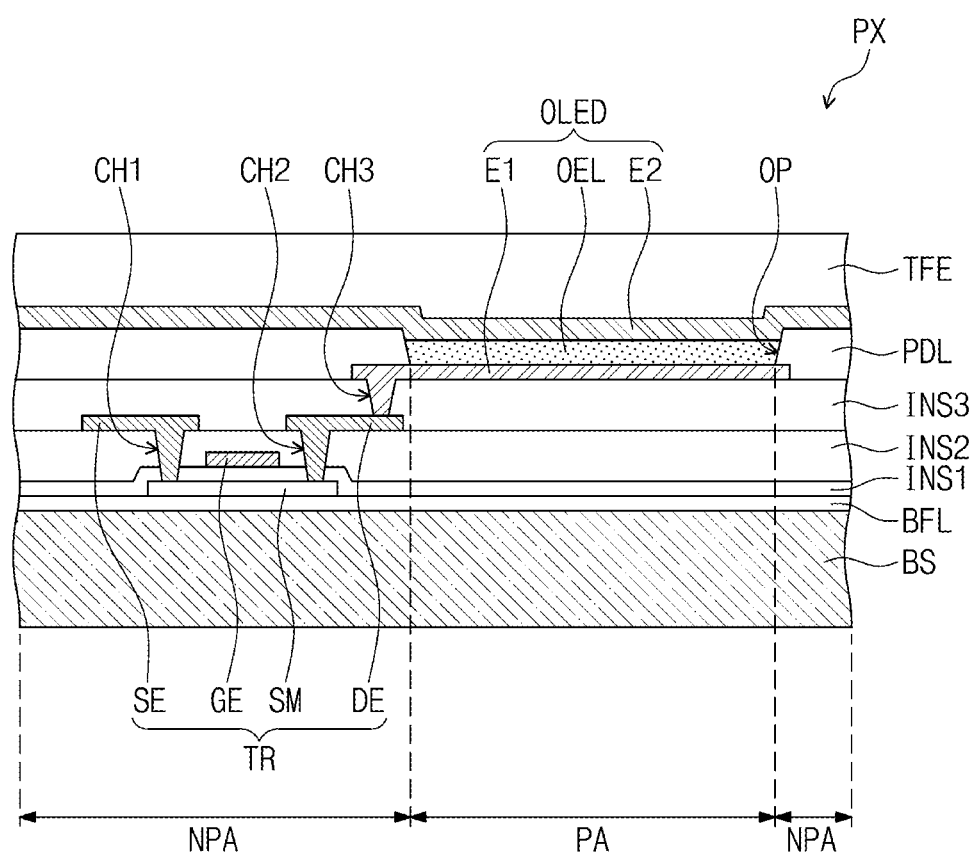
FIG. 3 is a cross-sectional view of one pixel arranged in a display module shown in FIG. 1.

FIG. 3 is a cross-sectional view of one pixel PX arranged in the display module DM shown in FIG. 1.

Referring to FIG. 3, the pixel PX includes an organic light emitting diode OLED and a transistor TR connected to the organic light emitting diode OLED. The transistor TR and the organic light emitting diode OLED are disposed on a base substrate BS.

The base substrate BS is a transparent flexible substrate. As an example, the base substrate BS includes a flexible plastic material, e.g., polyimide (PI). A buffer layer BFL is disposed on the base substrate BS and includes an inorganic material.

A semiconductor layer SM of the transistor TR is disposed on the buffer layer BFL. The semiconductor layer SM may include an inorganic semiconductor material, such as amorphous silicon or polysilicon, or an organic semiconductor material. In addition, the semiconductor layer SM may include an oxide semiconductor. The semiconductor layer SM includes a source area, a drain area, and a channel area defined between the source area and the drain area.

A first insulating layer INS1 is disposed on the buffer layer BFL to cover the semiconductor layer SM. The first insulating layer INS1 includes an inorganic material. A gate electrode GE of the transistor TR is disposed on the first insulating layer INS1 to overlap with the semiconductor layer SM. The gate electrode GE is disposed to overlap with the channel area of the semiconductor layer SM.

A second insulating layer INS2 is disposed on the first insulating layer INS1 to cover the gate electrode GE. The second insulating layer INS2 may be, but not limited to, an interlayer insulating layer. The second insulating layer INS2 includes an organic material and/or an inorganic material.

A source electrode SE and a drain electrode DE of the transistor TR are disposed on the second insulating layer INS2 to be spaced apart from each other. The source electrode SE is connected to the source area of the semiconductor layer SM through a first contact hole CH1 defined through the first insulating layer INS1 and the second insulating layer INS2. The drain electrode DE is connected to the drain area of the semiconductor layer SM through a second contact hole CH2 defined through the first insulating layer INS1 and the second insulating layer INS2.

A third insulating layer INS3 is disposed on the second insulating layer INS2 to cover the source electrode SE and the drain electrode DE of the transistor TR. The third insulating layer INS3 may be a planarization layer that provides a flat upper surface and may include an organic material.

A first electrode E1 of the organic light emitting diode OLED is disposed on the third insulating layer INS3. The first electrode E1 is connected to the drain electrode DE of the transistor TR through a third contact hole CH3 defined through the third insulating layer INS3. The first electrode E1 may be referred to as a pixel electrode or an anode electrode. The first electrode E1 may include a transmissive-type electrode or a reflective-type electrode.

A pixel definition layer PDL is disposed on the first electrode E1 and the third insulating layer INS3 such that a portion of the first electrode E1 is exposed. An opening OP through which the portion of the first electrode E1 is exposed is defined by the pixel definition layer PDL, and an area defined by the opening OP may be referred to as a pixel area PA. A peripheral area of the pixel area PA may be referred to as a non-pixel area NPA.

In the opening OP, an organic light emitting layer OEL is disposed on the first electrode E1. The organic light emitting layer OEL includes an organic material generating one of red, green, and blue lights. The organic light emitting layer OEL generates one of the red, green, and blue light. However, according to another embodiment, the organic light emitting layer OEL may generate a white light obtained by combining organic materials that respectively generate the red, green, and blue lights.

A second electrode E2 is disposed on the pixel definition layer PDL and the organic light emitting layer OEL. The second electrode E2 may be a common electrode or a cathode electrode. The second electrode E2 may include a transmissive-type electrode or a reflective-type electrode.

In a case that the display panel is a front surface light emitting type organic light emitting display panel, the reflective-type electrode is used as the first electrode E1, and the transmissive-type electrode is used as the second electrode E2. In a case that the display panel is a rear surface light emitting type organic light emitting display panel, the transmissive-type electrode is used as the first electrode E1, and the reflective-type electrode is used as the second electrode E2.

The organic light emitting diode OLED is disposed in the pixel area PA and includes the first electrode E1, the organic light emitting layer OEL, and the second electrode E2 in the pixel area PA. The first electrode E1 may be the anode electrode that is a hole injection electrode, and the second electrode E2 may be the cathode electrode that is an electron injection electrode.

A thin film encapsulation layer TFE is disposed on the organic light emitting diode OLED to cover the pixel PX. In detail, the thin film encapsulation layer TFE is disposed on the second electrode E2. The thin film encapsulation layer TFE includes an organic material and/or an inorganic material.

In order to allow the organic light emitting layer OEL to emit the light, a first voltage is applied to the first electrode E1, and a second voltage having a polarity opposite to that of the first voltage is applied to the second electrode E2 by the transistor TR. A hole and an electron are injected into the organic light emitting layer OEL and recombined in the organic light emitting layer OEL to generate an exciton. The organic light emitting diode OLED emits the light when an excited state of the exciton returns to a ground state. The organic light emitting diode OLED emits the red, green, or blue light depending on a flow of current to display predetermined image information.

Figure 4:
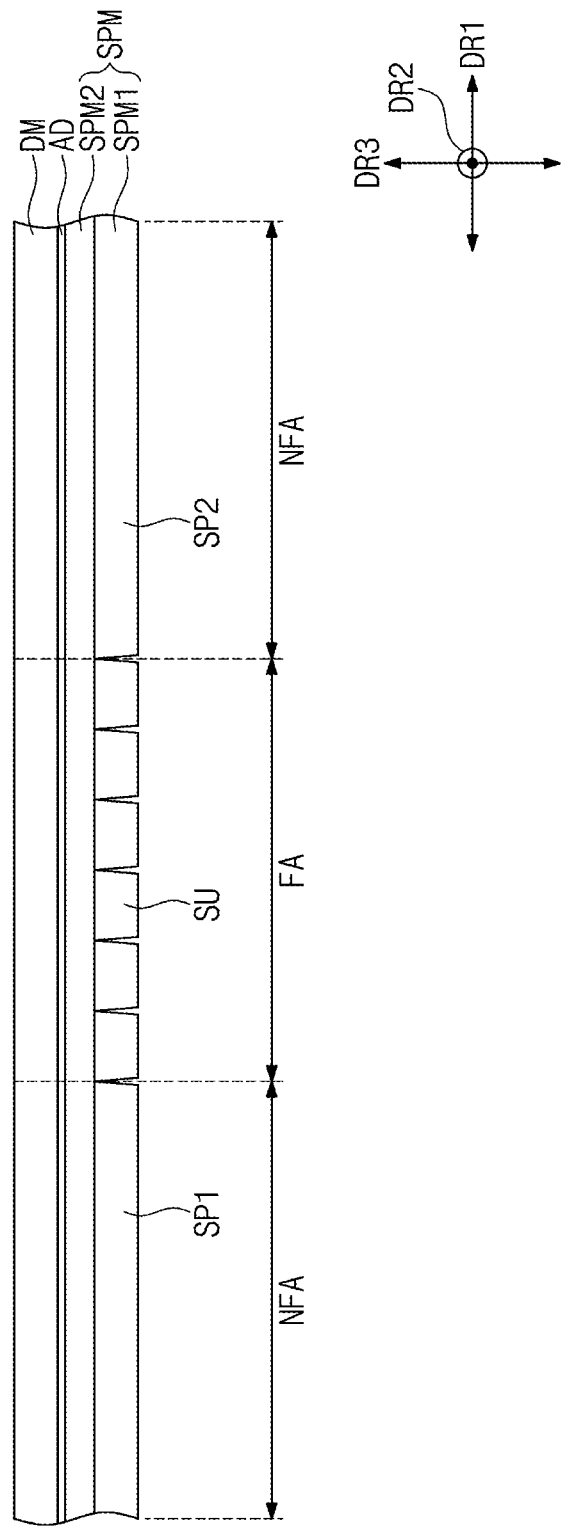
FIG. 4 is an enlarged view showing at least a part of a supporting member and a display module shown in FIG. 1.
Figure 5:
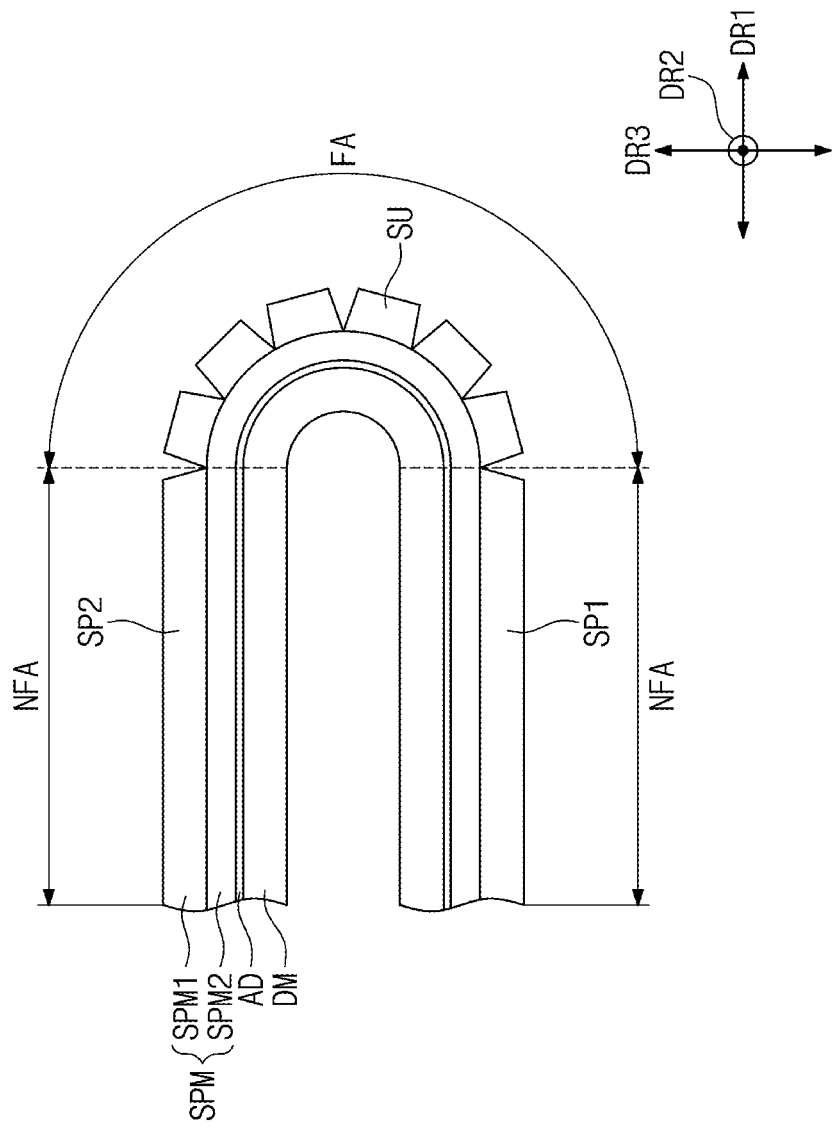
FIG. 5 illustrates a folding state of the supporting member and the display module shown in FIG. 4.

FIG. 4 is an enlarged view showing at least a part of the supporting member SPM and the display module DM shown in FIG. 1. FIG. 5 illustrates a folding state of the supporting member SPM and the display module DM shown in FIG. 4.

For the convenience of explanation, FIGS. 4 and 5 show the folding portion FA and a part of the non-folding portions adjacent to the folding portion FA of the display module DM.

Referring to FIGS. 4 and 5, when the display module DM is folded, the folding portion FA is bent, and the non-folding portions NFA maintain a flat state and are disposed to face each other. The folding portion FA rotates with respect to a rotational axis (e.g., the first and second rotational axes AX1 and AX2 shown in FIG. 1) parallel to the second direction DR2 to be bent, and the display module DM is inwardly folded (e.g., the in-folding state).

The supporting member SPM may be disposed under a rear surface of the display module DM opposite to a front surface of the display module DM in which the image is displayed. The supporting member SPM includes a first supporting member SPM1 disposed under the rear surface of the display module DM and a second supporting member SPM2 disposed between the rear surface of the display module DM and the first supporting member SPM1. The first supporting member SPM1 includes a metal material, and the second supporting member SPM2 includes an elastic material. For example, the first supporting member SPM1 includes aluminum or stainless steel. The second supporting member SPM2 includes rubber, silicon, or urethane.

An adhesive member AD is disposed between the second supporting member SPM2 and the display module DM. The adhesive member AD attaches the display module DM to the second supporting member SPM2.

The first supporting member SPM1 has a thickness from about 0.1 mm to about 0.5 mm in the third direction DR3. The second supporting member SPM2 has a thickness from about 0.2 mm to about 0.3 mm in the third direction DR3.

The first supporting member SPM1 includes a first supporter SP1, a second supporter SP2, and a plurality of supporting units SU disposed between the first supporter SP1 and the second supporter SP2. The first supporter SP1 and the second supporter SP2 overlap with the non-folding portions NFA, and the supporting units SU overlap with the folding portion FA. FIGS. 4 and 5 show a cross-section of each of the supporting units SU, and the supporting units SU may extend in the second direction DR2.

When the display device 100 is inwardly folded (i.e., the in-folding state), an inner surface of the display module DM may refer to surfaces of the non-folding portions NFA facing each other and a surface of the folding portion FA extending from the surfaces of the non-folding portions NFA facing each other. The surface of the folding portion FA and the surfaces of the non-folding portions NFA may be one surface integrally formed. An outer surface of the display module DM may refer to an opposite surface to the inner surface of the display module DM. The inner surface of the display module DM may be the front surface of the display module DM to display the image and the outer surface of the display module DM may be the rear surface of the display module DM.

Since the second supporting member SPM2 including elastic material is disposed on the outer surface of the display module DM, the folding portion FA may be easily bent when the display device 100 is inwardly folded (i.e., the in-folding state). The supporting units SU are disposed under the folding portion FA and when the display device 100 is inwardly folded (i.e., the in-folding state), gaps between the supporting members SU spaced apart from each other along the folding portion FA may be widened. Accordingly, although the supporting units SU include the metal material, the folding portion FA may be easily bent.

When the supporting member SPM is not disposed at the folding portion FA, a foreign matter is adhered to the outer surface of the folding portion FA, and thus the folding portion FA may be damaged. In addition, the folding portion FA may be deformed from repeated folding actions. In the exemplary embodiment of the present disclosure, since the second supporting member SPM2 covers the outer surface of the display module DM, the outer surface of the folding portion FA is not exposed to the outside when the display device 100 is inwardly folded (i.e., the in-folding state). Accordingly, no foreign matter is adhered to the outer surface of the folding portion FA, and thus damage to the folding portion FA may be prevented or reduced. In addition, since the second supporting member SPM2 is attached to the display module DM to support the display module DM, the deformation of the folding portion FA may be prevented or reduced.

Since the second supporting member SPM2 has the elasticity, the display module DM may not be supported flat by only the second supporting member SPM2 when the display module DM is unfolded. The first supporting member SPM1 including the metal material has a relatively rigid structure, and thus the display module DM may be more flatly supported by the first supporting member SPM1 when the display module DM is unfolded. In addition, since the folding portion FA is supported more firmly by the folding portion FA having the rigid structure, the folding portion FA may less deformed.

Consequently, according to the display device 100, the supporting member SPM protecting the folding portion FA of the display module DM is disposed under the folding portion FA, and thus the folding portion FA may be prevented or reduced from being damaged and deformed.

FIGS. 6A, 6B, 6C, 7, 8, 9, and 10 illustrate manufacturing methods of a display device according to exemplary embodiments of the present disclosure.

Figure 6A:
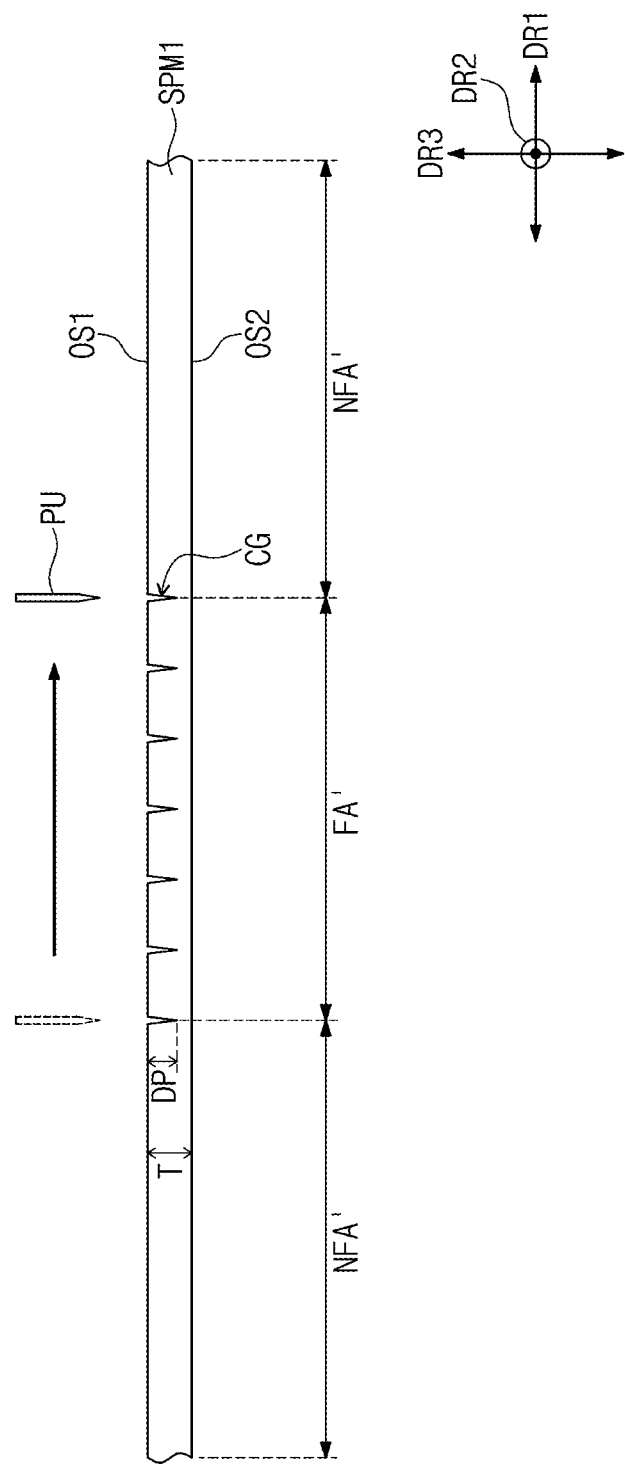
FIGS. 6A, 6B, 6C, 7, 8, 9, and 10 illustrate manufacturing methods of a display device according to exemplary embodiments of the present disclosure.
Figure 6B:
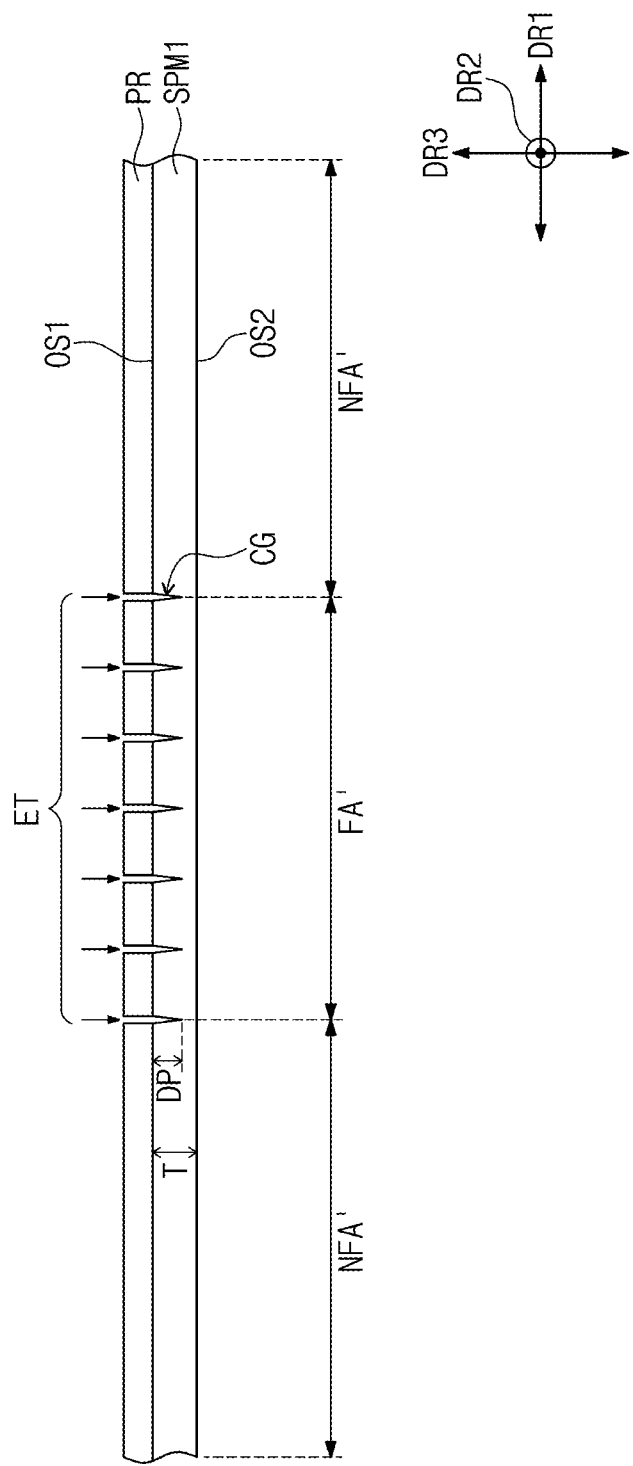
Figure 6C:
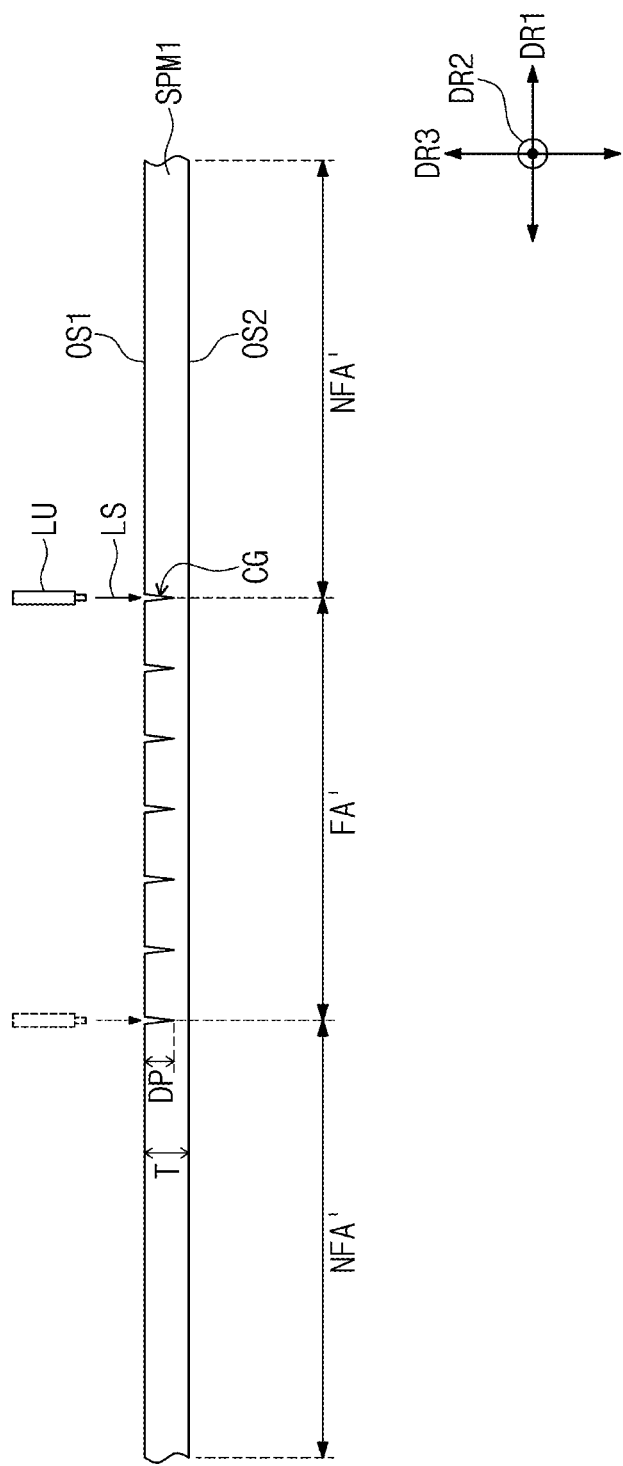

Referring to FIGS. 6A, 6B, and 6C, the first supporting member SPM1 is prepared, and a plurality of cutting grooves CG is formed in a first surface OS1 of the first supporting member SPM1. The first surface OS1 of the first supporting member SPM1 may be a plane surface substantially parallel to the first direction DR1 and the second direction DR2. An opposite surface to the first surface OS1 of the first supporting member SPM1 may be referred to as a second surface OS2.

Each of the cutting grooves CG has a depth DP equal to or greater than a half of a thickness T of the first supporting member SPM1 and smaller than the thickness T of the first supporting member SPM1 in the third direction DR3. The cutting grooves CG may extend in the second direction DR2.

The first supporting member SPM1 includes a folding area FA' corresponding to the folding portion FA of the display module DM and non-folding areas NFA' corresponding to the non-folding portions NFA of the display module DM. The cutting grooves CG are defined in the first surface OS1, which corresponds to the folding area FA', of the first supporting member SPM1. The cutting grooves CG may be formed in a variety of methods.

For example, referring to an exemplary embodiment illustrated in FIG. 6A, a press unit PU may be disposed above the first surface OS1 of the folding area FA'. The press unit PU applies a predetermined pressure onto the first surface OS1 of the folding area FA' to form the cutting grooves CG in the first surface OS1 of the folding area FA'.

Referring to an exemplary embodiment illustrated in FIG. 6B, a photoresist PR may be disposed on the first surface OS1 of the first supporting member SPM1. Portions of the photoresist PR, which correspond to portions of the folding area FA', are removed to form the cutting grooves CG. The first supporting member SPM1 is exposed through the portions from which the photoresist PR is removed.

Then, portions, in which the cutting grooves CG are formed, of the first supporting member SPM1 are etched (ET) using the photoresist PR as a mask. A time for the etching process (ET) is controlled, so that the portions of the first supporting member SPM1 exposed through the photoresist PR are etched to a predetermined depth without being completely etched. As a result, the cutting grooves CG may be defined in the first surface OS1 of the folding area FA'.

Referring to an exemplary embodiment illustrated in FIG. 6C, a laser unit LU may be disposed above the first surface OS1 of the folding area FA'. The laser unit LU irradiates a laser LS onto the first surface OS1 of the folding area FA' to define the cutting grooves CG in the first surface OS1 of the folding area FA'.

Figure 7:
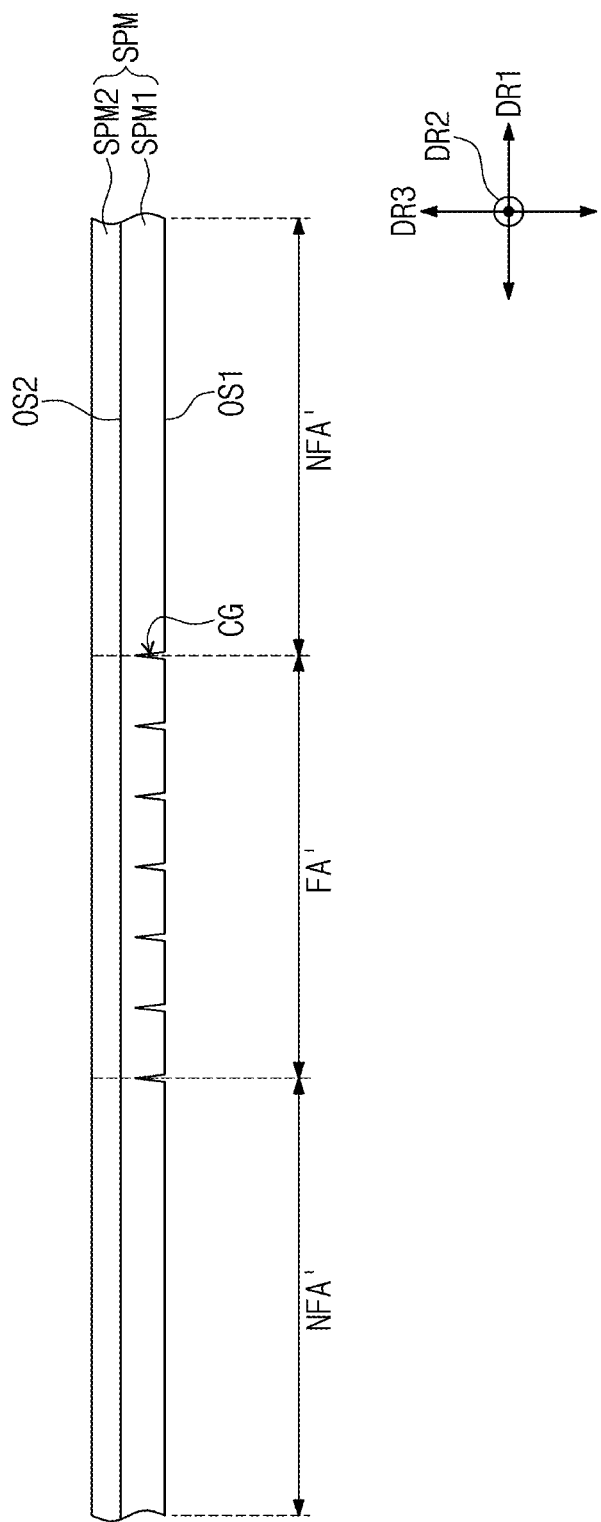

Referring to FIG. 7, the second supporting member SPM2 is disposed on the second surface OS2 of the first supporting member SPM1. In FIG. 7, the first surface OS1 of the first supporting member SPM1 may be a lower surface of the first supporting member SPM1, and the second surface OS2 of the first supporting member SPM1 may be an upper surface of the first supporting member SPM1.

The second supporting member SPM2 may be provided on the first supporting member SPM1 by a compression molding or injection molding process. An elastic material with fluidity is provided on the first supporting member SPM1 and cured to form the second supporting member SPM2. When the elastic material with fluidity is cured, the second supporting member SPM2 may be attached to the first supporting member SPM1.

Figure 8:
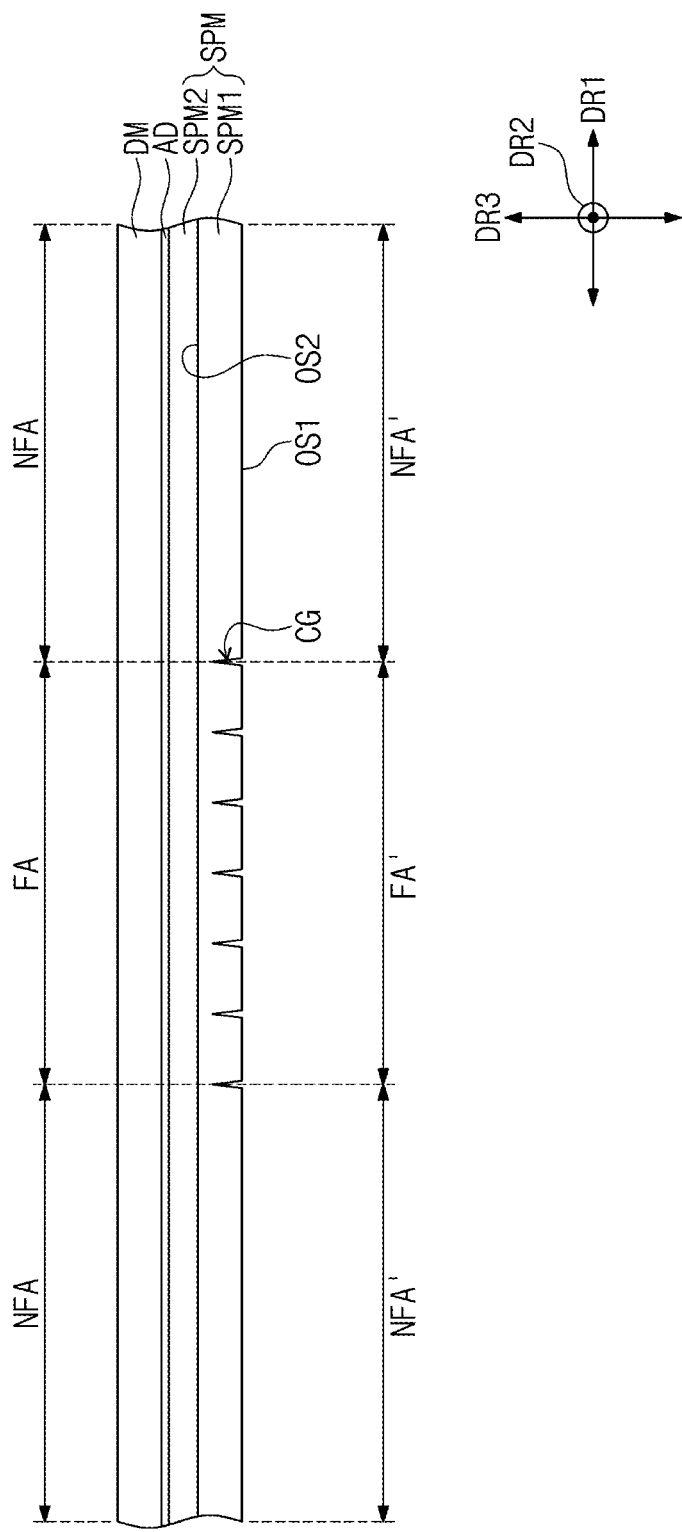

Referring to FIG. 8, the display module DM is provided on the second supporting member SPM2, and the adhesive member AD is provided between the display module DM and the second supporting member SPM2. The display module DM may be attached to the second supporting member SPM2 by the adhesive member AD.

Figure 9:
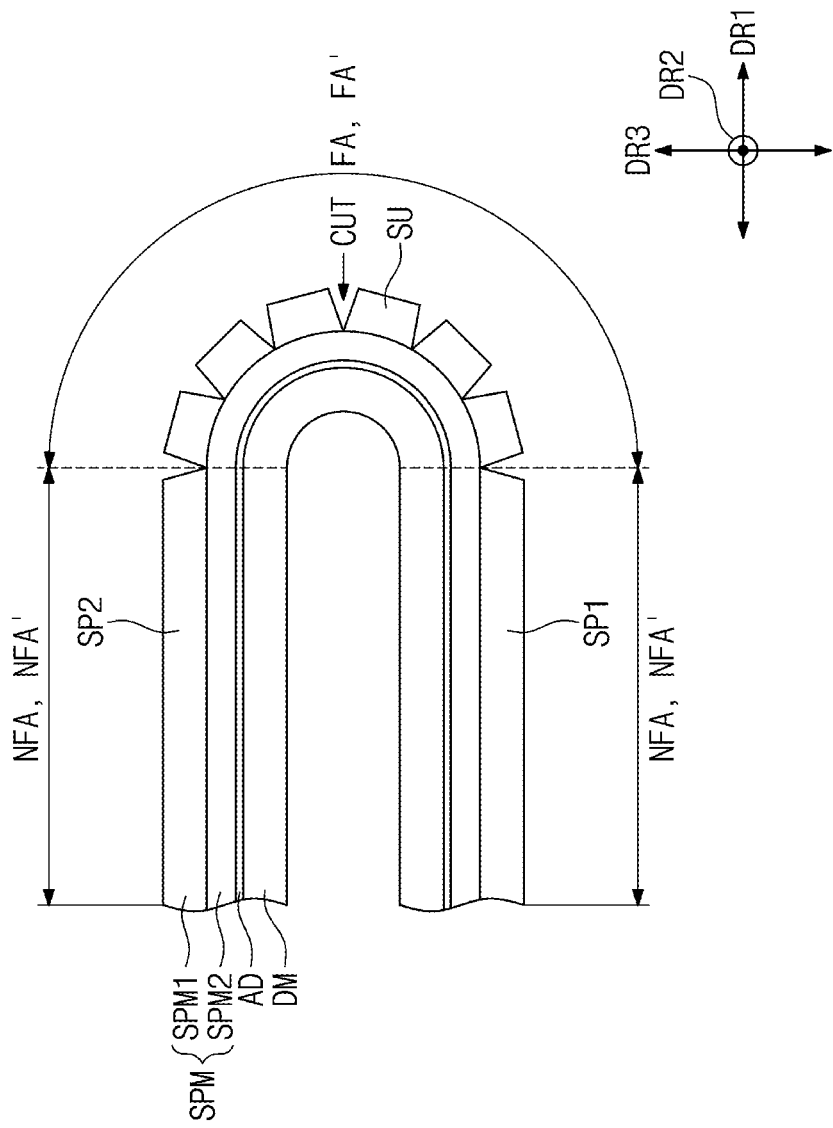

Referring to FIG. 9, the first and second supporting members SPM1 and SPM2 are folded, and thus the display module DM is inwardly folded (i.e., the in-folding state). The folding portion FA and the folding area FA' rotate with respect to the rotational axis (e.g., the first and second rotational axes AX1 and AX2 shown in FIG. 1) substantially parallel to the second direction DR2 to be bent.

When the folding portion FA and the folding area FA' are bent, a stress is applied in the folding area FA' of the first supporting member SPM1. The portions of the folding area FA' corresponding to the cutting grooves CG may be cut due to the stress. Accordingly, the plural supporting units SU may be formed in the folding area FA'. Also, depending on separating the portions of the folding area FA', the first supporter SP1 and the second supporter SP2 may be formed.

Figure 10:
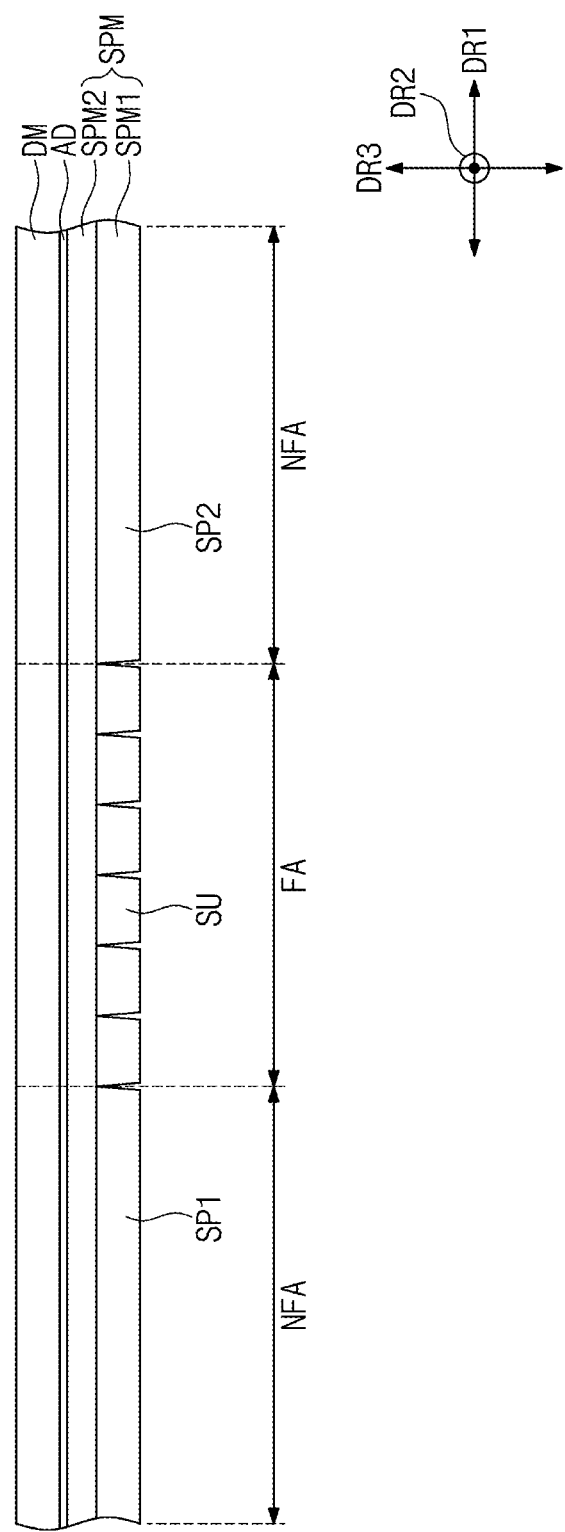

Referring to FIG. 10, the display module DM and the first and second supporting members SPM1 and SPM2 are unfolded. Since the supporting units SU are formed in the folding area FA', the first supporting member SPM1 may include the first supporter SP1, the second supporter SP2, and the supporting units SU disposed between the first supporter SP1 and the second supporter SP2.

In the exemplary embodiment of the present disclosure, one first supporting member SPM1 may be used and the first supporting member SPM1 may be separated by the cutting grooves CG so that the supporting units SU, the first supporter SP1, and the second supporter SP2 are formed.

According to a comparative embodiment, in which the supporting units SU are separately formed without using the cutting grooves CG and the second supporting member SPM2 may be separately prepared and disposed on to the separately formed support units SU. Additionally, the first supporter SP1 and the second supporter SP2 are required to be separately prepared. In this case, the separated supporting units SU are required to be disposed between the first supporter SP1 and the second supporter SP2. However, a process of precisely aligning the first and second supporters SP1 and SP2 with the separated supporting units SU is required, and as a result, the processes become complex.

In addition, even though the first and second supporters SP1 and SP2 are precisely aligned with the supporting units SU, the alignment between the first and second supporters SP1 and SP2 and the supporting units SU may be broken due to weight and flow of the elastic material having fluidity, which is provided on the first and second supporters SP1 and SP2 and the supporting units SU to form the second supporting member SPM2.

However, according to the exemplary embodiment of the present disclosure, the second supporting member SPM2 is provided on the first supporting member SPM1 after the cutting grooves CG are formed in the folding area FA' of the first supporting member SPM1. When the display module DM is attached to the second supporting member SPM2, the folding area FA' of the first supporting member SPM1 is bent, and thus the first and second supporters SP1 and SP2 and the supporting units SU may be formed. Accordingly, the first and second supporters SP1 and SP2 and the supporting units SU need not be prepared separately, and thus the process of aligning the first and second supporters SP1 and SP2 and the supporting units SU is not required.

Consequently, the manufacturing method of the display device 100 according to the exemplary embodiment of the present disclosure may be simplified.

Figure 11:
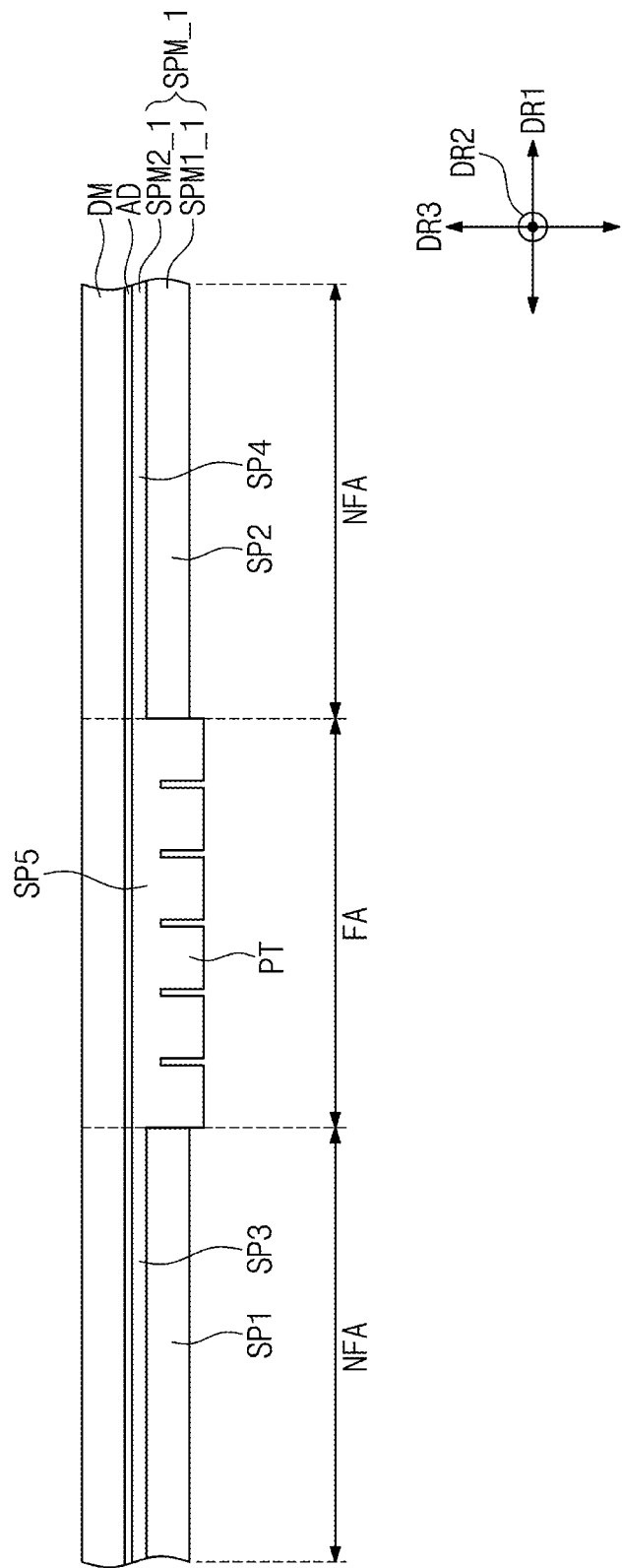
FIG. 11 is an enlarged view showing at least a part of a supporting member and a display module according to an exemplary embodiment of the present disclosure.
Figure 12:
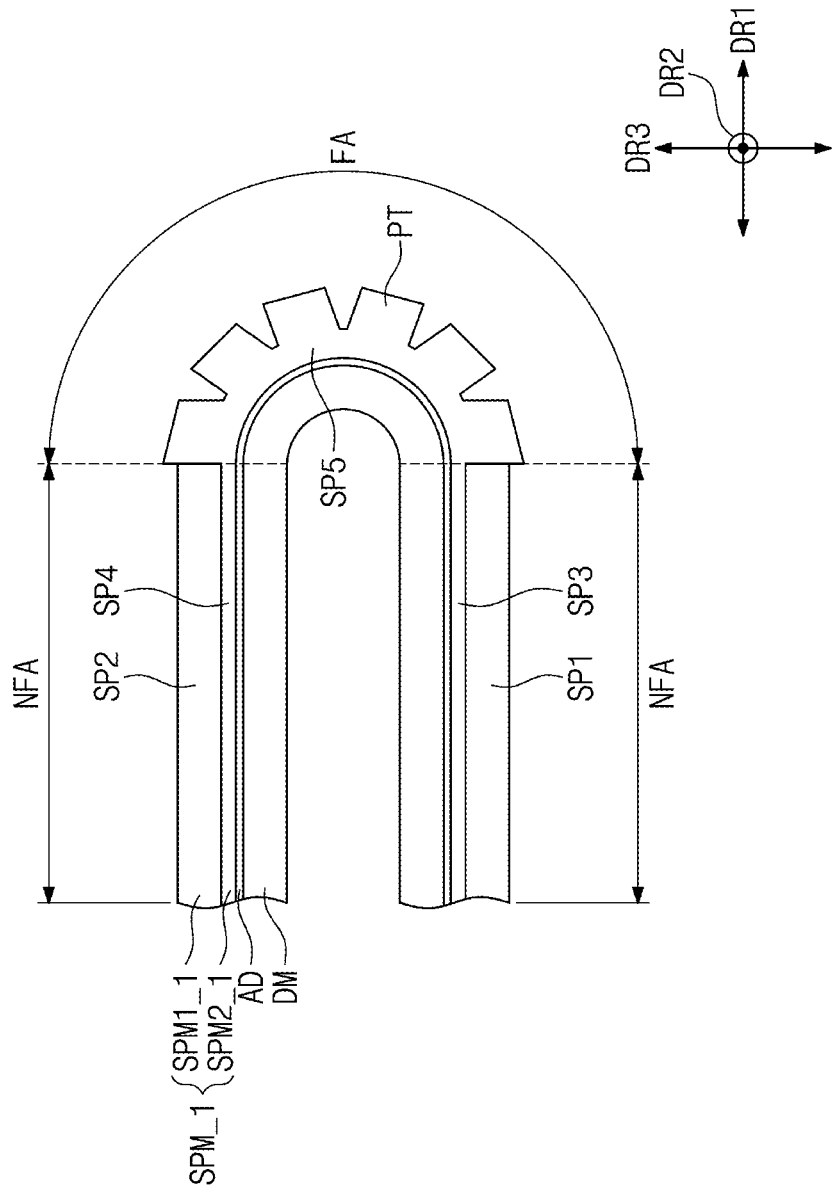
FIG. 12 illustrates a folding state of the supporting member and the display module shown in FIG. 11.

FIG. 11 is an enlarged view showing at least a part of a supporting member SPM_1 and a display module DM of a display device according to an exemplary embodiment of the present disclosure. FIG. 12 illustrates a folding state of the supporting member SPM_1 and the display module DM shown in FIG. 11.

For the convenience of explanation, FIGS. 11 and 12 show elements corresponding to those shown in FIGS. 4 and 5. The elements shown in FIGS. 11 and 12 are substantially the same as those shown in FIGS. 4 and 5 except for the supporting member SPM_1. Accordingly, configurations of the supporting member SPM_1 shown in FIGS. 11 and 12, which are different from those of the supporting member SPM shown in FIGS. 4 and 5, will be mainly described, and the same elements will be assigned with the same reference numerals.

Referring to FIGS. 11 and 12, the display module DM includes a folding portion FA and non-folding portions FA. The supporting member SPM_1 includes a first supporting member SPM1_1 and a second supporting member SPM2_1, and the first supporting member SPM1_1 is disposed under the display module DM. The first supporting member SPM1_1 includes a metal material. The first supporting member SPM1_1 includes a first supporter SP1 and a second supporter SP2, which respectively overlap with the non-folding portions NFA of the display module DM.

The second supporting member SPM2_1 includes a third supporter SP3, a fourth supporter SP4, and a fifth supporter SP5. The third supporter SP3, the fourth supporter SP4, and the fifth supporter SP5 may be a single body integrally formed. The second supporting member SPM2_1 may be disposed between the non-folding portions NFA of the display module DM and the first and second supporters SP1 and SP2. In addition, the second supporting member SPM2_1 may be disposed between the first supporter SP1 and the second supporter SP2. The second supporting member SPM2_1 may include an elastic material having predetermined elasticity. The second supporting member SPM2_1 may be provided on the first supporting member SPM1_1 by the above-mentioned compression molding or injection molding process. The display module DM may be attached to the second supporting member SPM2_1 by an adhesive member AD.

The second supporting member SPM2_1 includes a third supporter SP3 disposed between the first supporter SP1 and the non-folding portion NFA of the display module DM disposed on the first supporter SP1, a fourth supporter SP4 disposed between the second supporter SP2 and the non-folding portion NFA of the display module DM disposed on the second supporter SP2, and a fifth supporter SP5 disposed between the first supporter SP1 and the second supporter SP2.

The fifth supporter SP5 includes a plurality of protrusions PT, and the protrusions PT extend in the second direction DR2. According to the exemplary embodiments, The protrusions PT protrude toward the second direction DR past a lower surface of each of the first and second supporters SP1 and SP2.

Since the second supporting member SPM2_1 having the predetermined elasticity is disposed on an outer surface of the display module DM, the folding portion FA may be easily bent. In addition, as shown in FIG. 12, when the folding portion FA is bent, the protrusions PT are spaced apart from each other, and thus the folding portion FA may be more easily bent.

Since the second supporting member SPM2_1 covers the outer surface of the display module DM, no foreign matter is adhered to the outer surface of the folding portion FA, and as a result, the folding portion FA may be prevented from being damaged. In addition, since the fifth supporter SP5 has a thickness greater than that of the third and fourth supporters SP3 and SP4, the fifth supporter SP5 may more securely support the folding portion FA of the display module DM. As a result, the folding portion FA may be prevented from being deformed.

Figure 13:
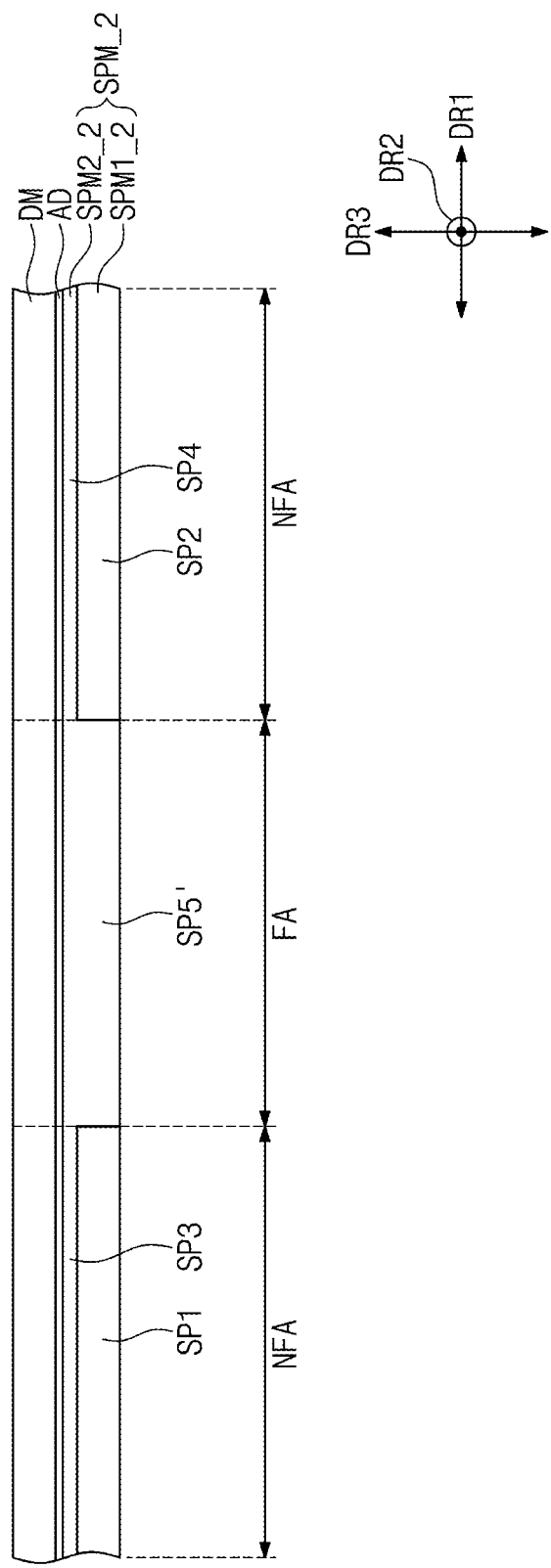
FIG. 13 is an enlarged view showing at least a part of a supporting member and a display module according to an exemplary embodiment of the present disclosure.
Figure 14:
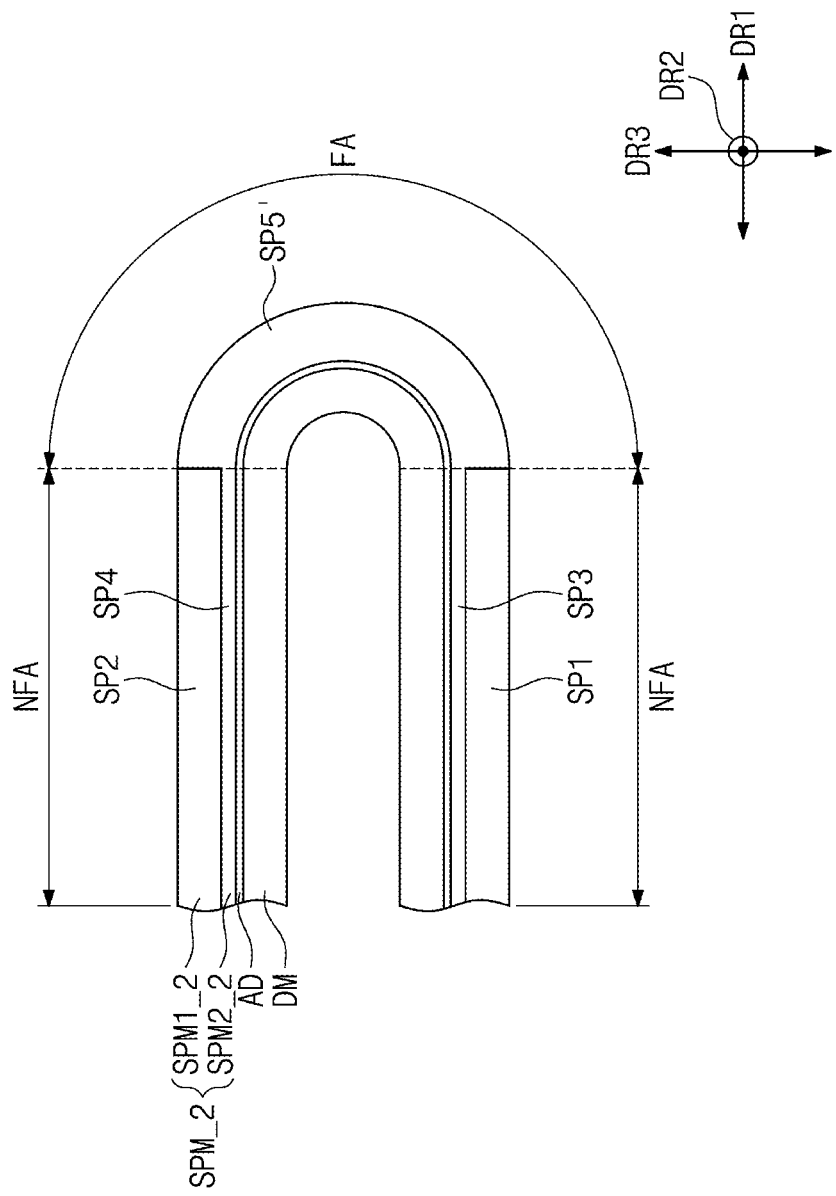
FIG. 14 illustrates a folding state of the supporting member and the display module shown in FIG. 13.

FIG. 13 is an enlarged view showing at least a part of a supporting member SPM_2 and a display module DM of a display device according to an exemplary embodiment of the present disclosure. FIG. 14 illustrates a folding state of the supporting member SPM_2 and the display module DM shown in FIG. 13.

Elements shown in FIGS. 13 and 14 are substantially the same as those shown in FIGS. 11 and 12 except for a second supporting member SPM2_2 of the supporting member SPM_2. Accordingly, configurations of the second supporting member SPM2_2 shown in FIGS. 13 and 14, which are different from those of the supporting member SPM2_1 shown in FIGS. 11 and 12, will be mainly described, and the same elements will be assigned with the same reference numerals.

Referring to FIGS. 13 and 14, a first supporting member SPM1_2 includes a first supporter SP1 and a second supporter SP2, and the second supporting member SPM2_2 includes a third supporter SP3, a fourth supporter SP4, and a fifth supporter SP5'.

The third supporter SP3 and the fourth supporter SP4 are disposed between non-folding portions NFA and the first and second supporters SP1 and SP2, respectively, and the fifth supporter SP5' is disposed between the first supporter SP1 and the second supporter SP2. A lower surface of the fifth supporter SP5' is disposed collinearly or formed flush with a lower surface of each of the first and second supporters SP1 and SP2.

Since the second supporting member SPM2_2 having the predetermined elasticity is disposed on an outer surface of the display module DM, the folding portion FA may be easily bent. The second supporting member SPM2_2 covers the outer surface of the display module DM, and thus no foreign matter is adhered to the outer surface of the folding portion FA, and the folding portion FA may be prevented from being damaged. In addition, since the fifth supporter SP5' has a thickness greater than that of each of the third and fourth supporters SP3 and SP4, the fifth supporter SP5' may more securely support the folding portion FA of the display module DM. As a result, the folding portion FA may be prevented from being deformed.

Figure 15:
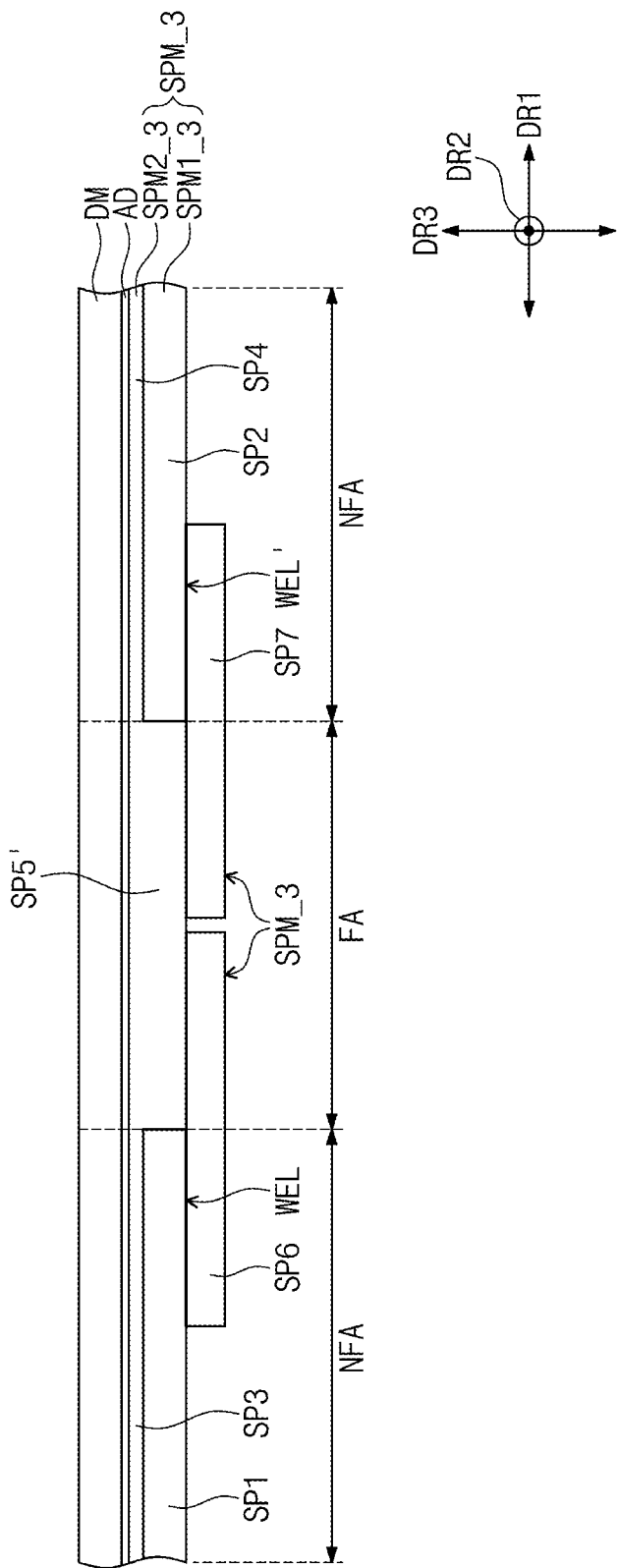
FIG. 15 is an enlarged view showing at least a part of a supporting member and a display module according to an exemplary embodiment of the present disclosure.
Figure 16:
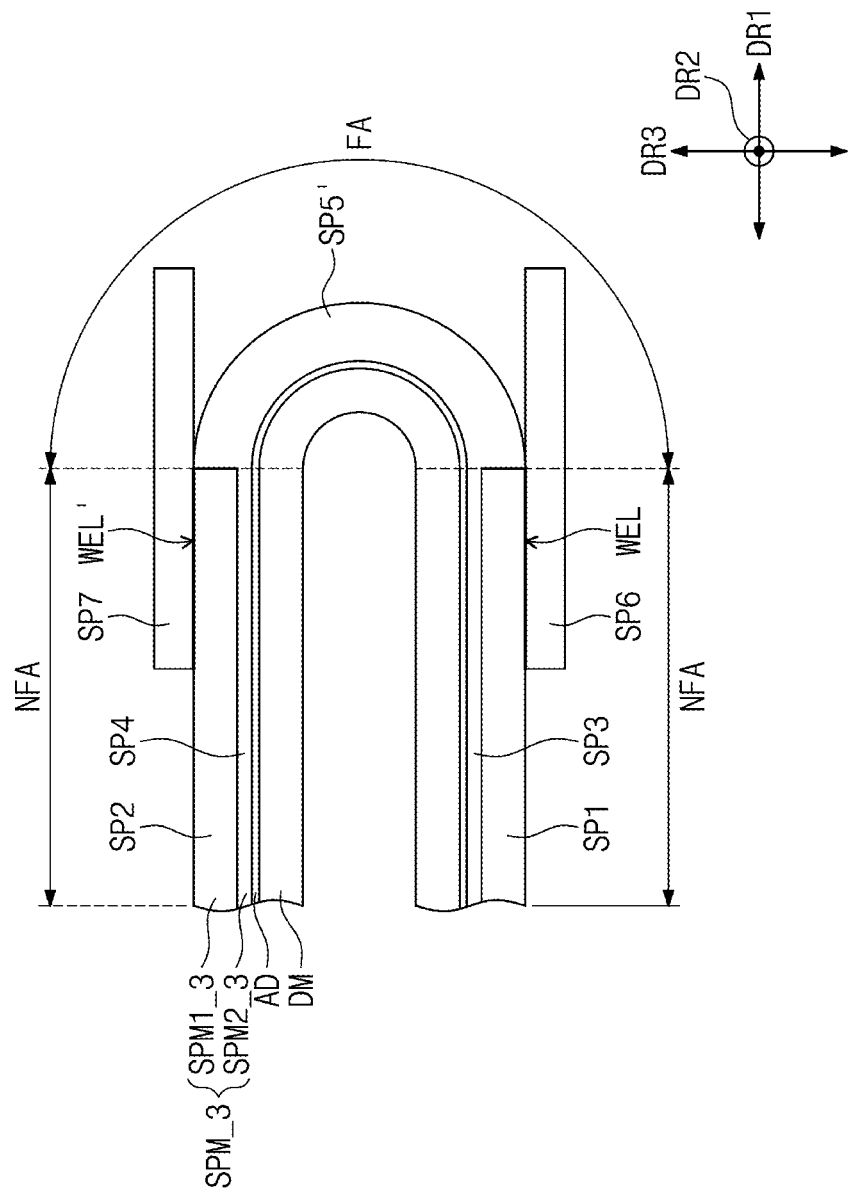
FIG. 16 illustrates a folding state of the supporting member and the display module shown in FIG. 15.

FIG. 15 is an enlarged view showing at least a part of a supporting member SPM_3 and a display module DM of a display device according to an exemplary embodiment of the present disclosure. FIG. 16 illustrates a folding state of the supporting member SPM_3 and the display module DM shown in FIG. 15.

Configurations of the supporting member SPM_3 shown in FIGS. 15 and 16 are substantially the same as those of the supporting member SPM_2 shown in FIGS. 13 and 14 except for sixth and seventh supporters SP6 and SP7. Accordingly, configurations of the supporting member SPM_3 shown in FIGS. 15 and 16 different from those of the supporting member SPM_2 shown in FIGS. 13 and 14 will be mainly described, and the same elements will be assigned with the same reference numerals.

Referring to FIGS. 15 and 16, the supporting member SPM_3 includes the sixth supporter SP6 disposed under a fifth supporter SP5' and a first supporter SP1 and the seventh supporter SP7 disposed under the fifth supporter SP5' and a second supporter SP2. The sixth and seventh supporters SP6 and SP7 include a metal material.

A portion of the sixth supporter SP6, which is disposed under a predetermined portion WEL of the first supporter SP1 adjacent to the fifth supporter SP5', may be connected to a lower portion of the predetermine portion WEL of the first supporter SP1. The predetermined portion WEL of the first supporter SP1 may be referred to as a welding area WEL. The sixth supporter SP6 may be connected to the welding area WEL of the first supporter SP1 by welding.

A portion of the seventh supporter SP7, which is disposed under a predetermined portion WEL' of the second supporter SP2 adjacent to the fifth supporter SP5', may be connected to a lower portion of the predetermine portion WEL' of the second supporter SP2. The predetermined portion WEL' of the second supporter SP2 may be referred to as a welding area WEL'. The seventh supporter SP7 may be connected to the welding area WEL' of the second supporter SP2 by welding. The sixth supporter SP6 and the seventh supporter SP7 are spaced apart from each other with respect to a center of the fifth supporter SP5'.

When a second supporting member SPM2_3 is provided on a first supporting member SPM1_3 by a compression molding or injection molding process, the sixth supporter SP6 and the seventh supporter SP7 may be respectively connected to the welding areas WEL and WEL'. Since the second supporting member SPM2_3 is already in a cured state, a portion of the sixth supporter SP6 other than the welding area WEL and a portion of the seventh supporter SP7 other than the welding area WEL' are not attached to the fifth supporter SP5'.

Since the second supporting member SPM2_3 having the predetermined elasticity is disposed on an outer surface of the display module DM and the sixth and seventh supporters SP6 and SP7 are not attached to the fifth supporter SP5', the folding portion FA may be easily bent. Since the second supporting member SPM2_3 covers the outer surface of the display module DM, the folding portion FA may be prevented from being damaged and deformed. When the display module DM is unfolded, the sixth and seventh supporters SP6 and SP7 having a more rigid structure than that of the fifth supporter SP5' is disposed under the fifth supporter SP5', and is thus the display module DM may be more securely supported.

Figure 17:
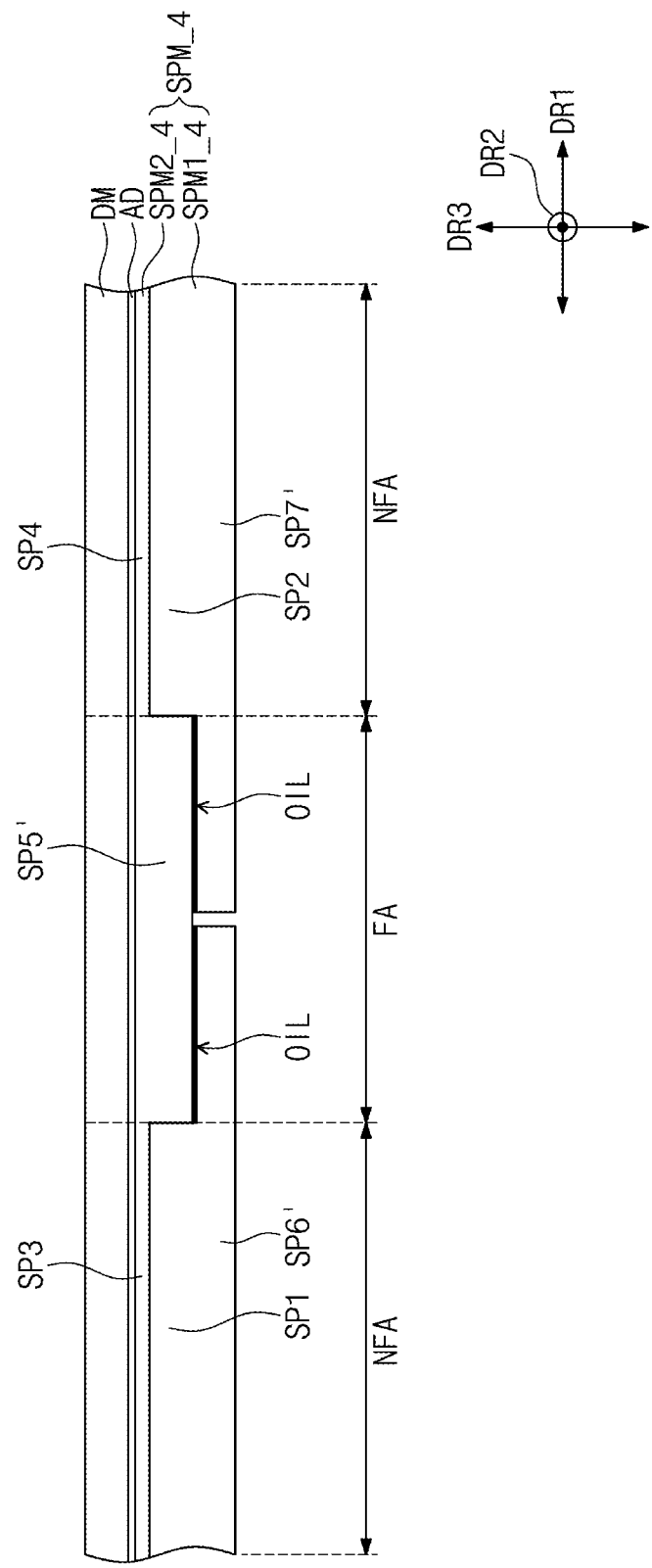
FIG. 17 is an enlarged view showing at least a part of each of a supporting member and a display module according to an exemplary embodiment of the present disclosure.

FIG. 17 is an enlarged view showing at least a part of each of a supporting member SPM_4 and a display module DM of a display device according to an exemplary embodiment of the present disclosure. FIG. 18 illustrates a folding state of the supporting member SPM_4 and the display module DM shown in FIG. 17.

Configurations of the supporting member SPM_4 shown in FIGS. 17 and 18 are substantially the same as those of the supporting member SPM_3 shown in FIGS. 15 and 16 except for a configuration of a first supporting member SPM1_4 of the supporting member SPM_4. Accordingly, configurations of the supporting member SPM_4 shown in FIGS. 17 and 18 different from those of the supporting member SPM_3 shown in FIGS. 15 and 16 will be mainly described, and the same elements will be assigned with the same reference numerals.

Referring to FIGS. 17 and 18, the first supporting member SPM1_4 includes a sixth supporter SP6' and a seventh supporter SP7'. The sixth supporter SP6' is disposed under a fifth supporter SP5' and a first supporter SP1. The seventh supporter SP7' is disposed under the fifth supporter SP5' and a second supporter SP2.

The first supporter SP1 and the sixth supporter SP6' are integrally formed with each other, and the second supporter SP2 and the seventh supporter SP7' are integrally formed with each other. The sixth supporter SP6' fully overlaps with the first supporter SP1, and the seventh supporter SP7' fully overlaps with the second supporter SP2.

The elastic material having the fluidity may be provided on the first supporting member SPM1_4 to form a second supporting member SPM2_4. When the elastic material having the fluidity is cured, the second supporting member SPM2_4 may be attached to the first supporting member SPM1_4.

In order to prevent portions of the sixth and seventh supporters SP6' and SP7', which overlap with the fifth supporter SP5', from being attached to the fifth supporter SP5', an oil layer OIL may be disposed on the portions of the sixth and seventh supporters SP6' and SP7', which overlap with the fifth supporter SP5'. Accordingly, even though the elastic material having the fluidity is cured, the portions of the sixth and seventh supporters SP6' and SP7', which overlap with the fifth supporter SP5', may not be attached to the fifth supporter SP5'.

Since the second supporting member SPM2_4 having the predetermined elasticity is disposed on an outer surface of the display module DM and the sixth and seventh supporters SP6' and SP7' are not connected to the fifth supporter SP5', the folding portion FA may be easily bent and prevented from being damaged and deformed. When the display module DM is unfolded, the sixth and seventh supporters SP6' and SP7' having a more rigid structure than that of the fifth supporter SP5' is disposed under the fifth supporter SP5', and thus the display module DM may be more securely supported.

Some of the advantages that may be achieved by exemplary embodiments of the current disclosure include reducing damage and/or deformation to the folding portion with the supporter disposed under the folding portion to protect the folding portion of the display module. In addition, the manufacturing method of the display device may be simplified.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A display device comprising:
   a display module comprising non-folding portions and a folding portion disposed between the non-folding portions;
   a first supporting member disposed under the display module; and a second supporting member disposed between the display module and the first supporting member, wherein the first supporting member comprises:

a first supporter and a second supporter overlapping with the non-folding portions; and a plurality of supporting units overlapping with the folding portion, wherein a side surface of the first supporter facing the plurality of the supporting units has an inclined surface forming a first acute angle with an upper surface of a portion of the second supporting member overlapping the non-folding portion disposed on the first supporter, a side surface of the second supporter facing the plurality of the supporting units has an inclined surface forming a second acute angle with an upper surface of a portion of the second supporting member overlapping the non-folding portion disposed on the second supporter.

2. The display device of claim 1, wherein the first supporting member comprises a metal material, and wherein the second supporting member comprises an elastic material.

3. The display device of claim 2, wherein the first supporting member comprises aluminum or stainless steel, and wherein the second supporting member comprises rubber, silicon, or urethane.

4. The display device of claim 1, further comprising an adhesive member attaching the display module to the second supporting member.

5. The display device of claim 1, wherein the second supporting member is attached to the first supporting member.

6. The display device of claim 1, wherein the folding portion and the non-folding portions are arranged in a first direction, and the plurality of supporting units extend in a second direction crossing the first direction.

7. The display device of claim 6, wherein the folding portion is configured to fold rotating with respect to a rotational axis substantially parallel to the second direction to fold the display module, and wherein the plurality of supporting units are spaced apart from each other along the folding portion in the first direction, and the display module is inwardly folded not to be exposed to an outside.

8. The display device of claim 6, wherein the first supporting member has a thickness from about 0.1 mm to about 0.5 mm in a third direction substantially vertical to a plane surface defined by the first and second directions.

9. The display device of claim 8, wherein the second supporting member has a thickness from about 0.2 mm to about 0.3 mm in the third direction.

10. The display device of claim 1, wherein when the folding portion is folded, a portion of the first supporting member overlapping the folding portion is cut into a plurality of units to a portion adjacent to an upper surface of the folding portion facing the display module in order to form of the plurality of supporting units.

11. The display device of claim 1, wherein the first acute angle is the same as the second acute angle.

12. The display device of claim 1, wherein the first acute angle is different from the second acute angle.

* * * * *